(12) United States Patent
Hamada et al.

(10) Patent No.: US 10,377,398 B2
(45) Date of Patent: Aug. 13, 2019

(54) TRAIN WIRELESS SYSTEM AND TRAIN LENGTH CALCULATION METHOD

(71) Applicant: MITSUBISHI ELECTRIC CORPORATION, Chiyoda-ku, Tokyo (JP)

(72) Inventors: Shingo Hamada, Tokyo (JP); Masahiro Chikamori, Tokyo (JP); Takashi Miyauchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/540,081

(22) PCT Filed: Jan. 16, 2015

(86) PCT No.: PCT/JP2015/051136
§ 371 (c)(1),
(2) Date: Jun. 27, 2017

(87) PCT Pub. No.: WO2016/113916
PCT Pub. Date: Jul. 21, 2016

(65) Prior Publication Data
US 2017/0349191 A1 Dec. 7, 2017

(51) Int. Cl.
*B61L 1/14* (2006.01)
*B61L 1/16* (2006.01)
(Continued)

(52) U.S. Cl.
CPC .............. *B61L 1/14* (2013.01); *B60L 15/40* (2013.01); *B61L 1/16* (2013.01); *B61L 3/121* (2013.01);
(Continued)

(58) Field of Classification Search
CPC ...... B61L 1/14; B61L 25/021; B61L 2205/04; B61L 23/00; B60L 15/40; B60L 15/0054;
(Continued)

(56) References Cited

U.S. PATENT DOCUMENTS 5,392,034 A * 2/1995 Kuwagaki .............. G08G 1/015
340/933
5,471,139 A * 11/1995 Zadoff ................... G01B 7/003
250/227.14

(Continued)

FOREIGN PATENT DOCUMENTS

JP 58-177765 A 10/1983
JP 60-004462 A 1/1985
(Continued)

OTHER PUBLICATIONS

Office Action (Notification of Reasons for Refusal) dated Oct. 3, 2017 by the Japanese Patent Office in corresponding Japanese Patent Application No. 2016-569211, and an English Translation of the Office Action. (3 pages).
(Continued)

*Primary Examiner* — Richard A Goldman
(74) *Attorney, Agent, or Firm* — Buchanan Ingersoll & Rooney PC

(57) ABSTRACT

A train wireless system includes a train detecting apparatus on the ground and a controller on a train. The detecting apparatus includes a detector and a calculator. The detector detects that the train is on rails in a block. The calculator measures an on-rail time during which the detector detects the train in the block, and calculates an on-rail detecting time during which the train has been on the rails in the block. The controller includes a distance measurer, a time measurer, a recorder, and a train-length calculator. The distance measurer measures a travelling distance of the train from a beginning of the block, the time measurer measures an
(Continued)

elapsed time since the distance measurer starts the measurement, the recorder records the elapsed time and the travelling distance, and the train-length calculator searches the recorder based on the detecting time, and calculates the train length using a selected travelling distance.

14 Claims, 5 Drawing Sheets

(51) Int. Cl.
    *B60L 15/40*     (2006.01)
    *B61L 15/00*     (2006.01)
    *B61L 25/02*     (2006.01)
    *B61L 3/12*     (2006.01)

(52) U.S. Cl.
    CPC ....... *B61L 15/0027* (2013.01); *B61L 15/0054* (2013.01); *B61L 15/0072* (2013.01); *B61L 25/021* (2013.01); *B61L 25/026* (2013.01); *B61L 2205/04* (2013.01)

(58) Field of Classification Search
    CPC ........ G08G 1/042; G08G 1/0016; G01B 7/00; G01B 7/003
    USPC ............................................. 701/19; 340/933
    See application file for complete search history.

(56) References Cited

U.S. PATENT DOCUMENTS

| | | | | |
|---|---|---|---|---|
| 5,491,475 A * | 2/1996 | Rouse | ................... | G08G 1/042 324/244 |
| 5,614,894 A * | 3/1997 | Stanczyk | ............... | G08G 1/015 340/933 |
| 5,803,411 A * | 9/1998 | Ackerman | ................ | B61L 3/00 246/169 R |
| 6,195,019 B1 * | 2/2001 | Nagura | ................ | G07B 15/063 235/384 |
| 6,611,210 B2 * | 8/2003 | Hilliard | ................. | G08G 1/015 340/906 |
| 6,999,886 B2 * | 2/2006 | Hilliard | ................. | G08G 1/042 340/933 |
| 8,179,282 B1 * | 5/2012 | MacCarley | .......... | G08G 1/0116 340/514 |
| 8,942,868 B2 * | 1/2015 | Kanner | ............... | B61L 15/0054 246/168 |
| 9,216,749 B2 * | 12/2015 | Itagaki | ....................... | B61L 1/10 |
| 2002/0154032 A1 * | 10/2002 | Hilliard | .................. | G08G 1/015 340/933 |
| 2003/0163263 A1 * | 8/2003 | Bertrand | ................ | G08G 1/042 702/65 |
| 2003/0174054 A1 * | 9/2003 | Shimomura | ............ | G01S 7/415 340/435 |
| 2007/0162218 A1 * | 7/2007 | Cattin | .................... | G08G 1/015 701/117 |
| 2007/0213890 A1 * | 9/2007 | Franckart | .................. | B61L 1/14 701/19 |
| 2011/0022253 A1 * | 1/2011 | Chen | ........................ | B61L 1/14 701/19 |
| 2014/0253309 A1 * | 9/2014 | Faeuster | ............... | B60W 50/16 340/438 |
| 2014/0379181 A1 * | 12/2014 | Fujimoto | ................ | B61L 3/125 701/19 |
| 2017/0349191 A1 * | 12/2017 | Hamada | .................... | B61L 1/14 |

FOREIGN PATENT DOCUMENTS

| | | |
|---|---|---|
| JP | 3-057769 A | 3/1991 |
| JP | 4-039161 A | 2/1992 |
| JP | 4-201673 A | 7/1992 |
| JP | 2665481 B2 | 10/1997 |
| JP | 9-295577 A | 11/1997 |
| JP | 10-297493 A | 11/1998 |
| JP | 2001-080516 A | 3/2001 |
| JP | 2006-232211 A | 9/2006 |
| JP | 2010-120544 A | 6/2010 |

OTHER PUBLICATIONS

International Search Report (PCT/ISA/210) dated Mar. 31, 2015, by the Japanese Patent Office as the International Searching Authority for International Application No. PCT/JP2015/051136.

Written Opinion (PCT/ISA/237) dated Mar. 31, 2015, by the Japanese Patent Office as the International Searching Authority for International Application No. PCT/JP2015/051136.

* cited by examiner

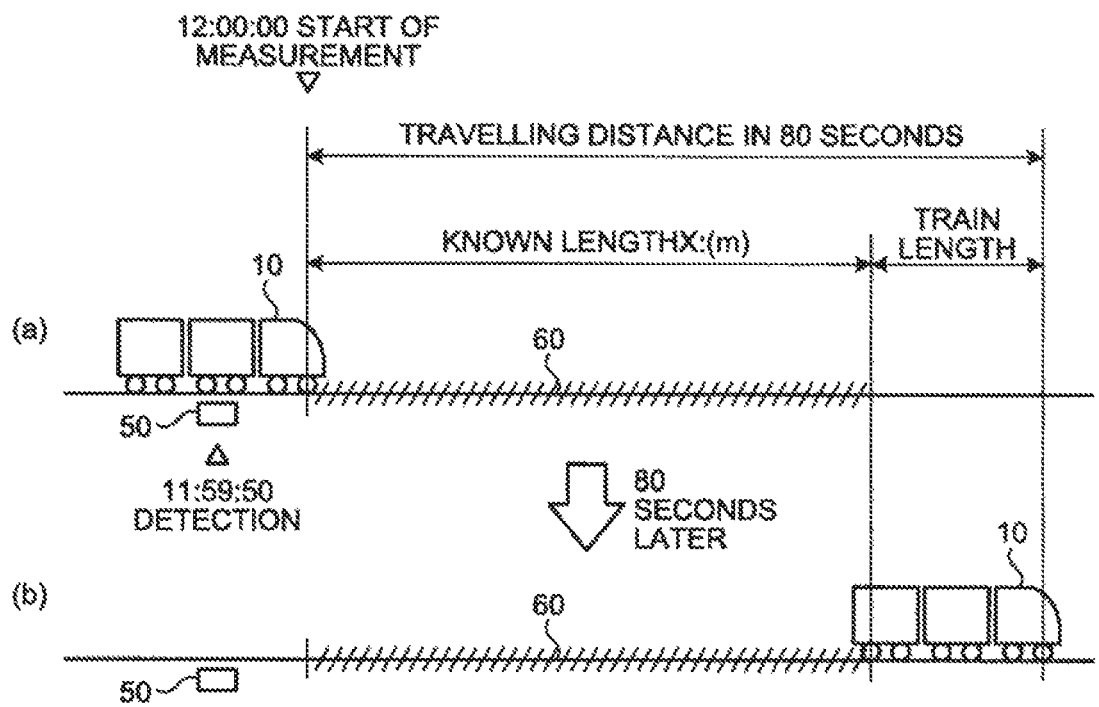

TRAIN WIRELESS SYSTEM AND TRAIN LENGTH CALCULATION METHOD

FIELD

The present invention relates to a train wireless system which performs wireless communication between a train side and a ground side, and a train length calculation method.

BACKGROUND

A conventional train wireless system, which performs traffic control on the basis of an interval between a train and another train preceding or following the train, needs to grasp the lengths and positions of the respective trains. The train wireless system can set a train length to a fixed value when the train has the fixed number of vehicle. However, the train wireless system encounters a problem in setting a length of a train such as a freight train whose number of vehicles of the train varies. When a train driver or a command person manually sets a train length on the basis of the number of vehicles, the mistake in inputting the train length may cause an accident such as collision of trains. With respect to the above problem, Patent Literature 1 below discloses technique for calculating a length of a travelling train by multiplying the velocity of the train by a travelling time during which the train travels.

CITATION LIST

Patent Literature

Patent Literature 1: Japanese Patent Application Laid-Open No. H04-201673

SUMMARY

Technical Problem

However, the conventional technology described above fails to accurately calculate the train length due to the velocity being zero and the travelling time being infinite when the train stops in accordance with a stop signal or the like. In addition to such a problem, a problem with this conventional technique is that facilities on the ground side need costly axle counters with a velocity detecting function.

The present invention has been made in view of the above, and an object of the present invention is to obtain a train wireless system capable of calculating a train length by using a simple configuration.

Solution to Problem

To solve the problem and achieve the object, the present invention provides a train wireless system comprising a train detecting apparatus installed on a ground and an on-board control apparatus mounted on a train, wherein the train detecting apparatus comprises: a detecting unit to detect that the train is on rails in a block that is a section having a track circuit; and a calculation unit to perform control to measure an on-rail time during which the detecting unit detects the train in the block, calculate and transmit, to the train, an on-rail detecting time during which the train has been on the rails in the block, and the on-board control apparatus comprises: a distance measurement unit to measure a travelling distance of the train from a beginning end of the block; a time measurement unit to measure an elapsed time since the distance measurement unit starts the measurement; a recording unit to record the elapsed time and the travel distance in association with each other; and a train-length calculation unit to search the recording unit on a basis of the on-rail detecting time acquired from the train detecting apparatus, and calculate a train length by using a selected travelling distance.

Advantageous Effects of Invention

The present invention achieves an effect that the train length can be calculated using the simple configuration.

BRIEF DESCRIPTION OF DRAWINGS

FIG. 4 is a diagram illustrating a state in which the train is at a beginning end of a block and a state in which the train is at a terminal end of the block.

FIG. 5 is a chart illustrating one example of elapsed times and travelling distances recorded in a recording unit.

DESCRIPTION OF EMBODIMENTS

Hereinbelow, a train wireless system and a train length calculation method according to an embodiment of the present invention will be described in detail with reference to the drawings. The invention is not limited to the embodiment.

Embodiment

Figure 1:
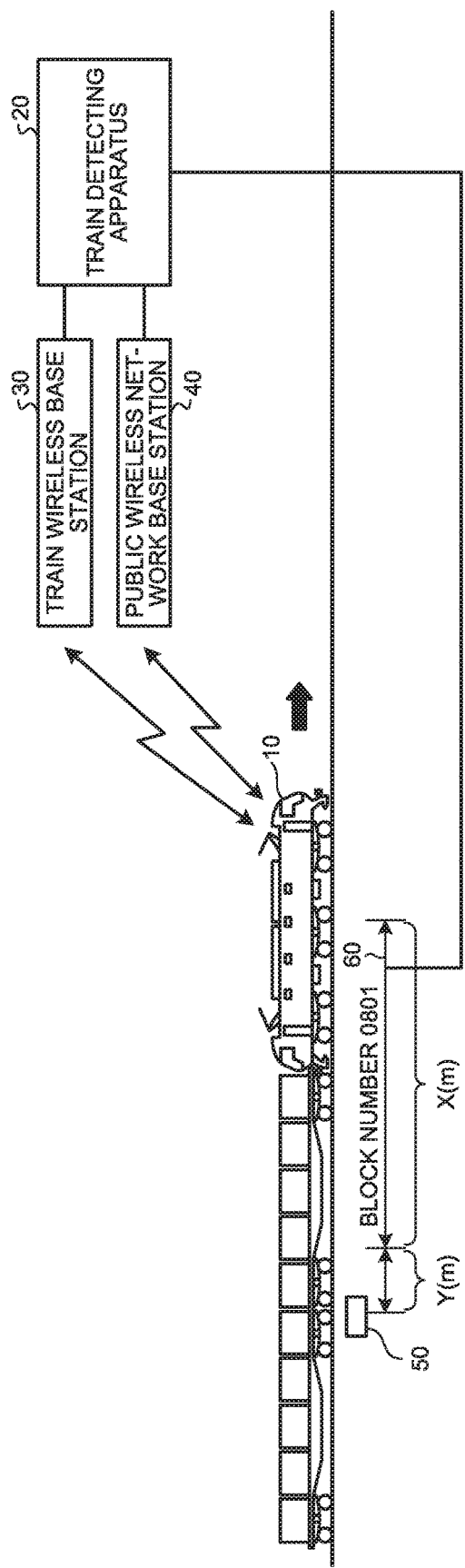
FIG. 1 is a diagram illustrating a configuration example of a train wireless system.
Figure 2:
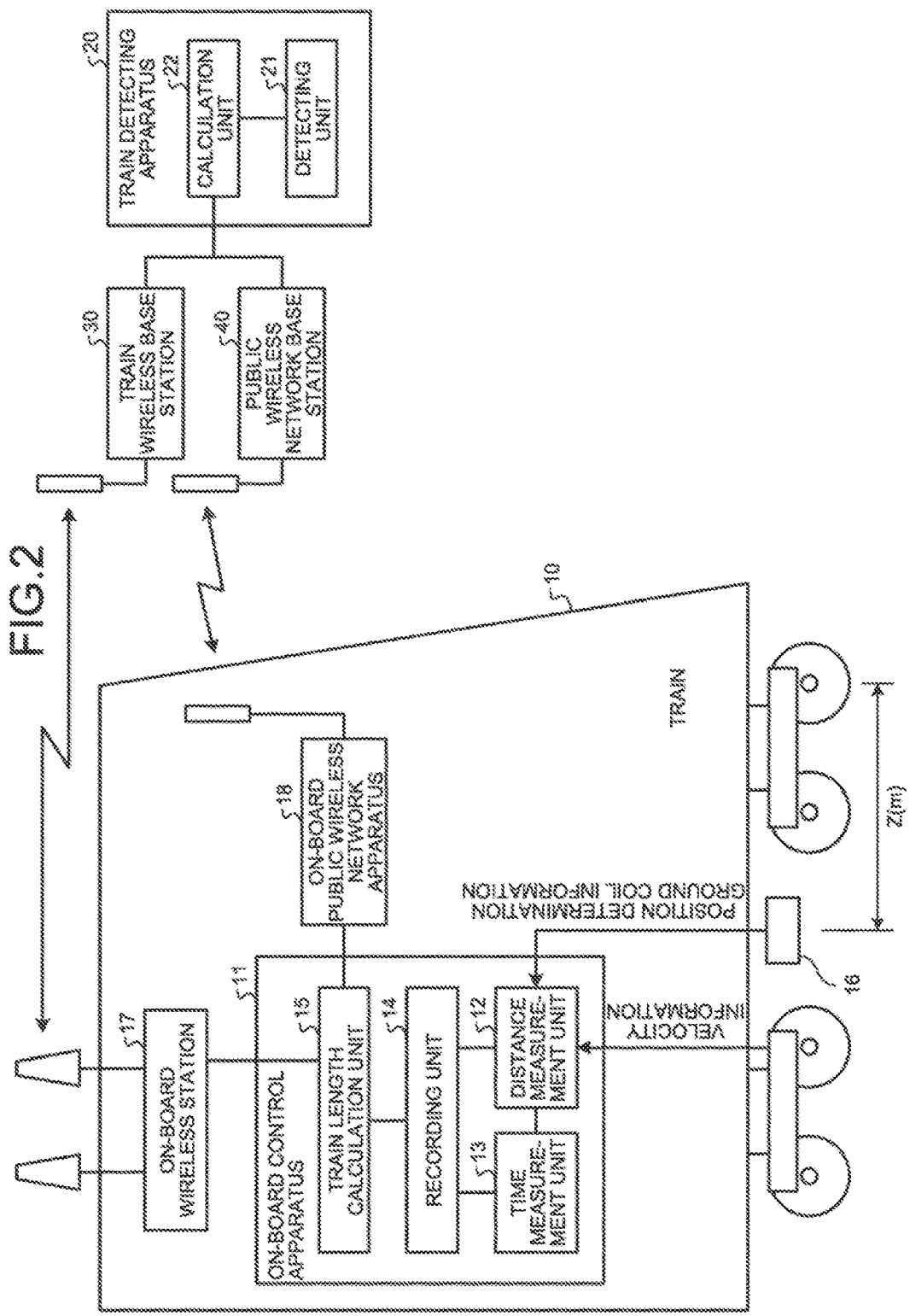
FIG. 2 is a block diagram illustrating configuration examples of a leading vehicle of a train and a train detecting apparatus.

FIG. 1 is a diagram illustrating a configuration example of a train wireless system according to an embodiment of the present invention. FIG. 2 is a block diagram illustrating configuration examples of a leading vehicle of a train 10 and a train detecting apparatus 20. The train 10 is assumed to travel from a left side to a right side in FIG. 1.

The train wireless system includes an on-board control apparatus 11 and the train detecting apparatus 20. The on-board control apparatus 11 is mounted on the train 10. The train detecting apparatus 20 is installed on the ground, and detects that the train 10 is on rails in a block 60 of a block number 0801. The block 60 is a section having a track circuit. The train detecting apparatus 20 can communicate with the on-board control apparatus 11 through communication using a licensed frequency band in the train wireless system via a train wireless base station 30, or can communicate with the on-board control apparatus 11 through communication using a public wireless network via a public wireless network base station 40.

In FIGS. 1 and 2, a distance Z (m) between a pickup coil 16 and an axle with which the train 10 first short-circuits the track circuit of the block 60 is a known value. A distance Y (m) between a position-determination track antenna beacon 50 and a beginning end of the block 60 is a known value. The pickup coil 16 determines a position of the train 10 upon moving past the position-determination track antenna beacon 50. After the train 10 travels a distance of Y–Z (m) since the train 10 detects the position-determination track antenna beacon 50, the on-board control apparatus 11 starts measuring a travelling distance and an elapsed time. The travelling distance is a distance by which the train 10 travels in the block 60 since the train 10 enters the rails in the block 60. The elapsed time is a period of time during which the travelling distance is measured.

Since the train 10 travels from the left side to the right side in FIG. 1, the left side and the right side of the block 60 are beginning and terminal ends thereof, respectively. The beginning end of the block 60 is the same as that of the track circuit, and the terminal end of the block 60 is the same as that of the track circuit. When the train detecting apparatus 20 detects that the train 10 is on the rails in the block 60, it is meant that the apparatus 20 detects that the train 10 short-circuits the track circuit. In the following description, it is noted that the train 10 short-circuiting the track circuit is construed to be on the rails in the block 60.

Subsequently, the configuration of the train detecting apparatus 20 will be described. The train detecting apparatus 20 includes a detecting unit 21 and a calculation unit 22. The detecting unit 21 detects that the train 10 is on the rails in the block 60 as the track circuit is short-circuited. The calculation unit 22 performs control to: measure an on-rail time during which the detecting unit 21 detects that the train 10 is on the rail in the block 60; calculate an on-rail detecting time during which the train 10 has been on the rail in the block 60, i.e., a period of time during which the train 10 has been short-circuiting the track circuit, after moving past the terminal end of the block 60; and transmit information on the on-rail detecting time to the train 10 via the train wireless base station 30 or the public wireless network base station 40.

Next, the configuration of the train 10 will be described. The train 10 includes the on-board control apparatus 11, the pickup coil 16, an on-board wireless station 17, and an on-board public wireless network apparatus 18. The on-board control apparatus 11 calculates a train length of the train 10. The pickup coil 16 detects the position-determination track antenna beacon 50 installed on the ground. The on-board wireless station 17 transmits and receives a signal to and from the train detecting apparatus 20 through communication using a licensed frequency band. The on-board public wireless network apparatus 18 transmits and receives a signal to and from the train detecting apparatus 20 through communication using a public wireless network. After the train length is obtained by the calculation, the train 10 can be controlled can be performed by the train wireless system. Since such control is performed similarly to ordinary control, a description thereof will be omitted except for the configuration regarding the calculation of the train length.

The on-board control apparatus 11 includes a distance measurement unit 12, a time measurement unit 13, a recording unit 14, and a train-length calculation unit 15. The distance measurement unit 12 measures a travelling distance by which the train 10 travels from the beginning end of the block 60. The time measurement unit 13 measures an elapsed time since the distance measurement unit 12 starts measuring the travelling distance of the train 10. The recording unit 14 records the elapsed time measured by the time measurement unit 13 and the travelling distance measured by the distance measurement unit 12 in association with each other. The train-length calculation unit 15 searches the recording unit 14 on the basis of the on-rail detecting time acquired from the train detecting apparatus 20, and obtains the train length of the train 10 by calculation using a selected travelling distance.

Figure 3:
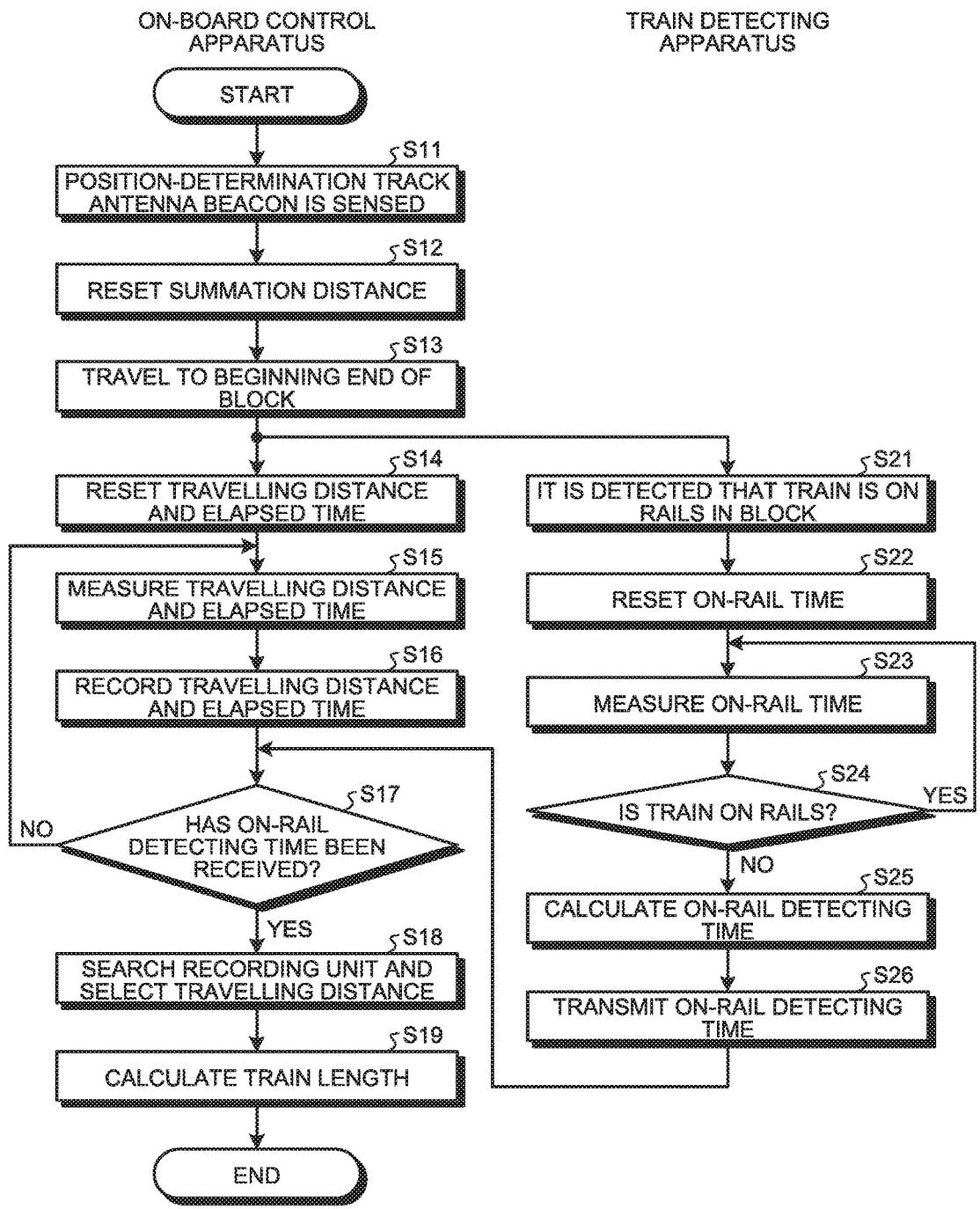
FIG. 3 is a flowchart illustrating a train length calculation operation performed by an on-board control apparatus and the train detecting apparatus.

Subsequently, a method for calculating the train length of the train 10 in the train wireless system will be described. FIG. 3 is a flowchart illustrating a train length calculation operation performed by the on-board control apparatus 11 and the train detecting apparatus 20.

First, in the on-board control apparatus 11 of the train 10, when the pickup coil 16 detects the position-determination track antenna beacon 50 (Step S11), the distance measurement unit 12 resets a summation distance obtained by adding up movement distances of the train 10 on the basis of position-determination track-antenna-beacon information from the pickup coil 16 (Step S12).

The distance measurement unit 12 measures the summation distance of the train 10 by "a wheel diameter of the train 10×π×(the number of pulses/the number of teeth in a wheel of the train 10)" on the basis of pulses of velocity information output from a velocity sensor (not illustrated). The distance measurement unit 12 measures a running distance similarly by the formula described above. When the train 10 travels to the beginning end of the block 60 (Step S13), more specifically, when the summation distance of the train 10 obtained since the summation distance measured so far is reset reaches a beacon-to-block distance of Y–Z (m) obtained by subtracting a known distance Z (m), which is a distance from the pickup coil 16 to the axle of the train 10 which first short-circuits the track circuit after entering the block 60, from a known distance Y (m) which is a distance from the position-determination track antenna beacon 50 to the beginning end of the block 60, the distance measurement unit 12 resets a travelling distance indicating a distance by which the train 10 has traveled so far in the block 60 (Step S14).

When the train 10 travels the distance Y–Z (m) and the travelling distance is reset after the resetting of the summation distance, the distance measurement unit 12 notifies the time measurement unit 13 so. When the time measurement unit 13 receives the notification from the distance measurement unit 12, in other words, when the train 10 travels the distance Y–Z (m) since the summation distance is reset, the time measurement unit 13 resets an elapsed time which is a period of time during which the distance measurement unit 12 measures the travelling distance (Step S14).

When resetting the travelling distance, the distance measurement unit 12 measures a travelling distance of the train 10 in the block 60 (Step S15). When resetting the elapsed time, the time measurement unit 13 measures an elapsed time (Step S15). The distance measurement unit 12 measures the travelling distance in a fixed cycle according to timing of pulses output from the velocity sensor, and records the measured travel distance in the recording unit 14 (Step S16). The time measurement unit 13 records the elapsed time in the recording unit 14 at timing when the distance measurement unit 12 measures and records the travelling distance in the recording unit 14 (Step S16).

The distance measurement unit 12 may record the travelling distance in the recording unit 14 and the time measurement unit 13 may record the elapsed time in the recording unit 14 in synchronization with each other. Alternatively, the distance measurement unit 12 may acquire information on the elapsed time from the time measurement unit 13, and then record the travelling distance and the elapsed time in the recording unit 14. In the recording unit 14, the elapsed time measured by the time measurement unit 13 and the travelling distance measured by the distance measurement unit 12 are recorded in association with each other.

When the train 10 travels to the beginning end of the block 60 (Step S13), on the other hand, the detecting unit 21 of the train detecting apparatus 20 detects that the train 10 is on the rails in the block 60 as the track circuit is short-circuited (Step S21).

When the detecting unit 21 detects that the train 10 is on the rails, the calculation unit 22 of the train detecting apparatus 20 resets the on-rail time which indicates a period of time during which the train 10 is on the rails in the block 60 (Step S22), and measures the on-rail time during which the detecting unit 21 detects that the train 10 is on the rails (Step S23). When the train 10 is on the rails in the block 60 (Step S24: Yes), the calculation unit 22 measures the on-rail time during which the detecting unit 21 detects that the train 10 is on the rails in the block 60 as the track circuit is short-circuited (Step S23).

When the train 10 is not on the rails in the block 60 (Step S24: No), in other words, when the train 10 moves past the terminal end of the block 60 and the detecting unit 21 can no longer detect that the train 10 is on the rails in the block 60, the calculation unit 22 calculates an on-rail detecting time during which the train 10 has been on the rails in the block 60, the on-rail detecting time being a period of time from the entry of the train 10 into the block 60 to the exiting of the train 10 from the block 60 (Step S25). The calculation unit 22 takes, as the on-rail detecting time, a period of time from when the detecting unit 21 detects that the train 10 is on the rails in the block 60 to when the detecting unit 21 can no longer sense that the train 10 is on the rails. However, when a delay time, which is a timer delay (TD), is set in the detecting unit 21 in order to allow the detecting unit 21 a margin in detecting the train 10, the calculation unit 22 takes, as the on-rail detecting time, a value obtained by subtracting the delay time from the time during which the detecting unit 21 has been detecting that the train 10 is on the rails in the block.

Then, the calculation unit 22 transmits information on the calculated on-rail detecting time to the train 10 via the train wireless base station 30 or the public wireless network base station 40 (Step S26). The calculation unit 22 may use either one or both of the train wireless base station 30 and the public wireless network base station 40. The calculation unit 22 may use the one base station usually, and when failing to communicate with the train via the one base station, the calculation unit 22 may use the other base station.

Either one or both of the on-board wireless station 17 and the on-board public wireless network apparatus 18 of train 10 can receive the information on the on-rail detecting time transmitted from the train detecting apparatus 20. Until the train 10 receives the information on the on-rail detecting time (Step S17: No), the distance measurement unit 12 measures the travelling distance (Step S15) and records the measured travelling distance in the recording unit 14 (Step S16), and the time measurement unit 13 measures the elapsed time (Step S15) and records the measured elapsed time in the recording unit 14 (Step S16).

In the train 10, when the train 10 receives the information on the on-rail detecting time (Step S17: Yes), the train-length calculation unit 15 searches the recording unit 14 on the basis of the on-rail detecting time acquired from the train detecting apparatus 20 and selects a travelling distance used for calculation of a train length (Step S18). More specifically, the elapsed times recorded in the recording unit 14 include elapsed times that meet the condition "the elapsed times≥the on-rail detecting time". The train-length calculation unit 15 selects the shortest one of the travelling distances recorded with the elapsed times which meet the condition.

Then, the train-length calculation unit 15 uses the selected travel distance to calculate a train length by "the selected travelling distance−the known length X (m) of the block 60+an extra length" (Step S19). The length X (m) of the block 60 is a known value. The extra length is a length determined in consideration of a portion of the train 10 which cannot be detected in the block 60.

In FIG. 3, Steps S11 to S15 can be taken as a step of measuring the travelling distance and the elapsed time. Step S16 can be taken as a step of recording the elapsed time and the travel distance. Steps S21 to S26 can be taken as a step of calculating the on-rail detecting time during which the train 10 has been on the rails in the block 60. Steps S17 to S19 can be taken as a step of calculating the train length.

The train-length calculation method will be described using a specific example. FIG. 4 is a diagram illustrating a state in which the train 10 is at the beginning end of the block 60 and a state in which the train 10 is at the terminal end of the block 60. FIG. 5 is a chart illustrating one of example of the elapsed times and the travelling distances recorded in the recording unit 14.

FIG. 4(*a*) illustrates a state in which the train 10 detects the position-determination track antenna beacon 50 at "11:59:50," and enters the block 60 at "12:00:00," when the train 10 starts measuring a travelling distance and an elapsed time. FIG. 4(*b*) illustrates a state in which the train 10 has moved past the block 60 after a lapse of 80 seconds following the entry into the block 60. The train 10, which enters the block 60, should travel a distance that is the sum of the length of the block 60 and the length of the train 10 in order to move past the block 60. In other words, if the travelling distance by which the train 10 has traveled in 80 seconds is known, a train length of the train 10 can be obtained by subtracting the known length X (m) of the block 60 from the travelling distance.

As illustrated in FIG. 4(*a*), by the time the train 10 enters the block 60 and the train detecting apparatus 20 can detect that the train 10 is on the rails in the block 60, the train 10 has already entered the block 60 at its portion having a distance from the front end of the train 10 to the train's axle that first enters the block 60, in other words, first short-circuits the track circuit. As illustrated in FIG. 4(*b*), at a point of time when the train 10 exits the block 60 and the train detecting apparatus 20 can no longer detect that the train 10 is on the rails in the block 60, in other words, when the track circuit is no longer short-circuited, the train 10 is still in the block 60 at its portion having a distance from the rear end of the train 10 to the train's axle that has last short-circuited the track circuit. Therefore, the calculation of the train length should take into consideration an extra length that is the sum of the distance from the front end of the train 10 to the train's first axle that short-circuits the track circuit and the distance from the rear end of the train 10 to the train's last axle that has short-circuited the track circuit.

When the train-length calculation unit 15 receives from the train detecting apparatus 20 information indicating that an on-rail detecting time during which the train 10 has been on the rails in the block 60 is 80 seconds, the train-length calculation unit 15 can search the recording unit 14, and select the travel distance of "80 m" at the elapsed time of "12:01:20" which is 80 seconds after the elapsed time of "12:00:00" at which the measurement of the travelling distance has started. The train-length calculation unit 15 can obtain the train length by the above formula using the selected "80 m."

With regard to the on-rail detecting time received from the train detecting apparatus 20, a delay time may be set in the train detecting apparatus 20, in which case the train-length calculation unit 15 receives the on-rail detecting time from the train detecting apparatus 20 at a delayed timing after the train 10 actually moves past the block 60. Even in this case, when the train length calculation unit 15 receives the on-rail detecting time from the train detecting apparatus 20, the train-length calculation unit 15 can search the recording unit 14 retroactively from the current time and select a travelling distance, because the recording unit 14 records a travelling distance for each elapsed time.

FIG. 5 illustrates an example in which an elapsed time and a travel distance are recorded every one second. The interval between the elapsed times is, as described above, an interval of pulses output from the velocity sensor (not illustrated). For the pulse interval of 0.2 seconds, thus, the measurement of the travelling distance by the distance measurement unit 12, the measurement of the elapsed time by the time measurement unit 13, and the recording of the travelling distance and the elapsed time in the recording unit 14 are done every 0.2 seconds. In FIG. 5, among the elapsed times recorded in the recording unit 14 is an elapsed time corresponding to the on-rail detecting time received from the train detecting apparatus 20. However, no elapsed time can correspond to the on-rail detecting time when a unit of the on-rail detecting time is one second or smaller. In that case, among the elapsed times recorded in the recording unit 14, the elapsed times which the train-length calculation unit 15 takes as candidates in selecting a travelling distance should meet the condition "the elapsed times≥the on-rail detecting time", as described above.

Although, in FIG. 5, the time measurement unit 13 measures the elapsed times to display the same using time points, this is only an example. The elapsed times may be displayed like zero second, one second, and two seconds. With a function such as a stopwatch, the calculation unit 22 of the train detecting apparatus 20 will suffice to measure the time during which the detecting unit 21 detects the train 10 in the block 60 because the calculation unit 22 is only required to be capable of measuring a period during which the train 10 is on the rails in the block 60. It is not necessary for the calculation unit 22 to have a timepiece function, and even when having the timepiece function, the calculation unit 22 need not synchronize with the train 10.

In the train 10, the train-length calculation unit 15 of the on-board control apparatus 11 transmits information on the calculated train length to a ground control apparatus of the train wireless system via the on-board wireless station 17 or the on-board public wireless network apparatus 18. It is also possible to incorporate the train detecting apparatus 20 in the ground control apparatus. It is also possible for the train-length calculation unit 15 to transmit the train length to the train detecting apparatus 20 via the on-board wireless station 17 or the on-board public wireless network apparatus 18, and transmit information thereon to the ground control apparatus via a ground-side network. Consequently, train control for the train 10 can be achieved in the train wireless system.

Figure 6:
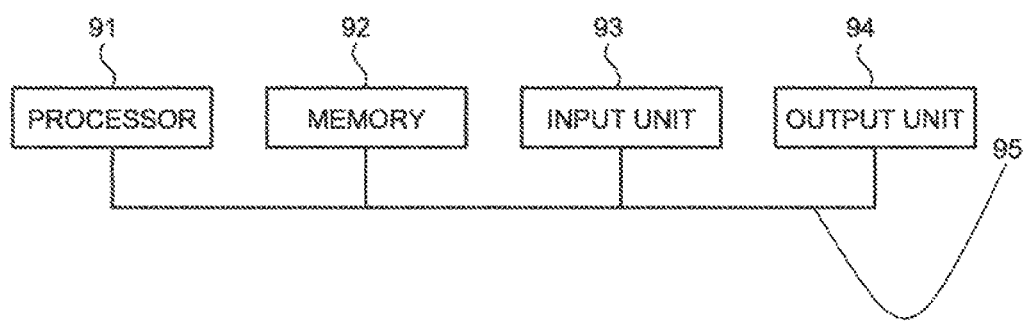
FIG. 6 is a diagram illustrating a hardware configuration of the on-board control apparatus.

A description will be given for a hardware configuration which provides each element in the block diagram of the on-board control apparatus 11 illustrated in FIG. 2. FIG. 6 is a diagram illustrating the hardware configuration of the on-board control apparatus 11. The distance measurement unit 12 and the time measurement unit 13 are implemented by an input unit 93 and a processor 91 which executes a program stored in a memory 92. The recording unit 14 is implemented by the memory 92. The train-length calculation unit 15 is implemented by the input unit 93, an output unit 94, and the processor 91 which executes a program stored in the memory 92. The processor 91, the memory 92, the input unit 93, and the output unit 94 are connected by a system bus 95. In the on-board control apparatus 11, a plurality of processors 91 and a plurality of memories 92 may cooperate to execute a function of each element illustrated in the block diagram in FIG. 2. While the on-board control apparatus 11 can be implemented by the hardware configuration illustrated in FIG. 6, the apparatus 11 can be implemented by either of software and hardware. The train detecting apparatus 20 can be implemented by the hardware configuration illustrated in FIG. 6 as well.

As described above, according to the present embodiment, the train wireless system includes the train detecting apparatus 20 installed on the ground and the on-board control apparatus 11 mounted on the train 10. The detecting unit 21 of the train detecting apparatus 20 detects that the train 10 is on the rails in the block 60 having the track circuit and the calculation unit 22 calculates and transmits the on-rail detecting time to the train 10. In the on-board control apparatus 11 of the train 10, the distance measurement unit 12 measures the travelling distance of the train 10 from the beginning end of the block 60 and records the travelling distance in the recording unit 14, the time measurement unit 13 measures the elapsed time since the distance measurement unit 12 starts measuring the travelling distance and records the elapsed time in the recording unit 14, and the train length calculation unit 15 searches the recording unit 14 on the basis of the on-rail detecting time acquired from the train detecting apparatus 20, and calculates the train length by using the selected travel distance. This eliminates the necessity of installing the costly axle counter with the velocity-detecting function. The train wireless system uses the existing block 60 and the non-powered position-determination track antenna beacon 50 for entering the train wireless system to enable the on-board control apparatus 11 to calculate the train length by using the known length and the travelling distance selected on the basis of the on-rail detecting time from the record of travelling distances for respective elapsed times from the start of the measurement of the travelling distance. That is, the train length can be calculated by the simple configuration.

The configuration described in the embodiment above indicates one example of the content of the present invention and can be combined with other known technology, and a part thereof can be omitted or modified without departing from the gist of the present invention.

REFERENCE SIGNS LIST

10 train, 11 on-board control apparatus, 12 distance measurement unit, 13 time measurement unit, 14 recording unit, 15 train-length calculation unit, 16 pickup coil, 17 on-board wireless station, 18 on-board public wireless network apparatus, 20 train detecting apparatus, 21 detecting unit, 22 calculation unit, 30 train wireless base station, 40 public wireless network base station, 50 position-determination track antenna beacon, 60 block, 91 processor, 92 memory, 93 input unit, 94 output unit, 95 system bus.

The invention claimed is:

1. A train wireless system comprising:
   a train detecting apparatus installed on a ground; and
   an on-board control apparatus mounted on a train, wherein:
   the train detecting apparatus includes at least one processor that:
      detects that the train is on rails in a block that is a section of the rails having a track circuit; and
      controls measurement of an on-rail time during which the train is detected in the block, and calculation and transmission, to the train, of an on-rail detecting time during which the train has been on the rails in the block, and
   the on-board control apparatus includes at least another processor that:
      measures a travelling distance of the train from a beginning end of the block, wherein the travelling distance is measured when, after a position-determination track antenna beacon is detected by a pickup coil, the train travels a distance obtained by subtracting a distance from the pickup coil to an axle of the train from a distance from the position-determination track antenna beacon to the beginning end of the block, the axle short-circuiting the track circuit first in the train;
      measures an elapsed time since the measurement of the traveling distance is started;
      records the elapsed time and the traveling distance in a memory in association with each other; and
      searches recorded elapsed times on a basis of the on-rail detecting time acquired from the train detecting apparatus, and calculates a train length using an accordingly selected travelling distance.

2. The train wireless system according to claim 1, wherein
   recorded elapsed times include elapsed times that meet a condition that the elapsed times are equal to or greater than the on-rail detecting time, and
   the on-board control apparatus selects a shortest one of travelling distances recorded with the elapsed times that meet the condition.

3. The train wireless system according to claim 1, wherein
   the on-board control apparatus takes, as the train length, a value obtained by subtracting a known length of the block from the selected travel distance, and adding an extra length thereto.

4. The train wireless system according to claim 3, wherein
   the extra length is a sum of a distance from a front end of the train to an axle of the train that short-circuits the track circuit first in the train, and a distance from a rear end of the train to an axle of the train that has short-circuited the track circuit last in the train.

5. The train wireless system according to claim 1, wherein
   when a delay time is set in determination of whether the train is on the rails in the block, the train detecting apparatus takes, as the on-rail detecting time, a value obtained by subtracting the delay time from the on-rail time.

6. The train wireless system according to claim 1, wherein
   the train detecting apparatus controls the transmission of the on-rail detecting time via a train wireless base station that performs communication using a licensed frequency band in a train wireless system, and
   in the train, a licensed-frequency-band on-board wireless station receives the on-rail detecting time through communication using the licensed frequency band, and outputs the on-rail detecting time to the on-board control apparatus.

7. The train wireless system according to claim 1, wherein
   the train detecting apparatus controls the transmission of the on-rail detecting time via a public wireless network base station that performs communication using a public wireless network, and
   in the train, an on-board public wireless network apparatus receives the on-rail detecting time through communication using the public wireless network, and outputs the on-rail detecting time to the on-board control apparatus.

8. A train-length calculation method in a train wireless system comprising a train detecting apparatus installed on a ground and an on-board control apparatus mounted on a train, the method comprising:
   measuring, via at least an input unit and at least one processor of the on-board control apparatus, a travelling distance of the train from a beginning end of a block that is a section of the rails having a track circuit, and measuring an elapsed time since the measurement of the traveling distance is started, wherein measuring the travelling distance and the elapsed time comprises measuring the travelling distance and the elapsed time when, after a position-determination track antenna beacon is detected by a pickup coil, the train travels a distance obtained by subtracting a distance from the pickup coil to an axle of the train from a distance from the position-determination track antenna beacon to the beginning end of the block, the axle short-circuiting the track circuit first in the train;
   recording the elapsed time and the travel distance in a memory in association with each other;
   measuring, via the at least one processor of the on-board control apparatus, an on-rail time during which the train is on rails in the block, and calculating an on-rail detecting time during which the train has been on the rails in the block; and
   searching, via the at least one processor of the on-board control apparatus, the memory on a basis of the on-rail detecting time, and calculating a train length using an accordingly selected travelling distance.

9. The train length calculation method according to claim 8, wherein
   elapsed times recorded in the memory include elapsed times that meet a condition that the elapsed times are equal to or greater than the on-rail detecting time, and
   searching the memory and calculating the train length comprises selecting a shortest one of travelling distances recorded with the elapsed times that meet the condition.

10. The train length calculation method according to claim 8, wherein
    searching the memory and calculating the train length comprises taking, as the train length, a value obtained by subtracting a known length of the block from the selected travel distance, and adding an extra length thereto.

11. The train length calculation method according to claim 10, wherein
    the extra length is a sum of a distance from a front end of the train to an axle of the train that short-circuits the track circuit first in the train, and a distance from a rear end of the train to an axle of the train that has short-circuited the track circuit last in the train.

12. The train length calculation method according to claim 8, wherein
when a delay time is set in determination of whether the train is on the rails in the block, measuring the on-rail time and calculating the on-rail detecting time comprises taking, as the on-rail detecting time, a value obtained by subtracting the delay time from the on-rail time.

13. The train length calculation method according to claim 8, comprising:
transmitting the on-rail detecting time via a train wireless base station that performs communication using a licensed frequency band in a train wireless system; and
receiving the on-rail detecting time through communication using the licensed frequency band, and outputting the on-rail detecting time to the on-board control apparatus.

14. The train length calculation method according to claim 8, comprising:
transmitting the on-rail detecting time via a public wireless network base station that performs communication using a public wireless network; and
receiving the on-rail detecting time through communication using the public wireless network, and outputting the on-rail detecting time to the on-board control apparatus.

\* \* \* \* \*